US008352483B1

(12) United States Patent
Ramesh et al.

(10) Patent No.: US 8,352,483 B1
(45) Date of Patent: Jan. 8, 2013

(54) SCALABLE TREE-BASED SEARCH OF CONTENT DESCRIPTORS

(75) Inventors: Sunil Ramesh, Palo Alto, CA (US);
Arnab S. Dhua, Palo Alto, CA (US);
Max Delgadillo, Palo Alto, CA (US);
Raghavan Manmatha, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 232 days.

(21) Appl. No.: 12/778,957

(22) Filed: May 12, 2010

(51) Int. Cl.
*G06F 7/00* (2006.01)
*G06F 17/30* (2006.01)

(52) U.S. Cl. .................................. 707/758; 707/769

(58) Field of Classification Search ............... None
See application file for complete search history.

(56) References Cited

U.S. PATENT DOCUMENTS

| | | | | |
|---|---|---|---|---|
| 5,710,916 | A | * | 1/1998 | Barbara et al. ................ 1/1 |
| 5,734,791 | A | * | 3/1998 | Acero et al. ................ 704/222 |
| 6,104,344 | A | * | 8/2000 | Wax et al. ................ 342/378 |
| 6,144,755 | A | * | 11/2000 | Niyogi et al. ................ 382/118 |
| 6,633,817 | B1 | * | 10/2003 | Walker et al. ................ 702/19 |
| 7,383,285 | B1 | | 6/2008 | Pal et al. |
| 7,617,206 | B1 | | 11/2009 | Hu et al. |
| 7,725,484 | B2 | | 5/2010 | Nister et al. |
| 2003/0174179 | A1 | | 9/2003 | Suermondt et al. |
| 2009/0089244 | A1 | | 4/2009 | Donato et al. |
| 2009/0304114 | A1 | * | 12/2009 | Burg ................ 375/340 |

OTHER PUBLICATIONS

Lowe, D.G., "Object Recognition from Local Scale-Invariant Features," *Proc. of the International Conference on Computer Vision*, Sep. 1999, pp. 1-8.
Muja, M. et al., "Fast Approximate Nearest Neighbors With Automatic Algorithm Configuration," *International Conference on Computer Vision Theory and Application*, 2009, 10 pages.
Nistér, D. et al., "Scalable Recognition with a Vocabulary Tree," *2006 IEEE Computer Society Conference on Computer Vision and Pattern Recognition (CVPR 2006)*, Jun. 17-22, 2006, New York, NY, 8 pages.
Philbin, J. et al., "Object retrieval with large vocabularies and fast spatial matching," *2007 IEEE computer Society Conference on Computer Vision and Pattern Recognition (CVPR 2007)*, Jun. 18-23, 2007, Minneapolis, MN, 8 pages.
Schindler, G. et al., "City-Scale Location Recognition," *2007 IEEE Computer Society Conference on Computer Vision and Pattern Recognition (CVPR 2007)*, Jun. 18-23, 2007, Minneapolis, MN, 7 pages.

* cited by examiner

*Primary Examiner* — Jay Morrison
(74) *Attorney, Agent, or Firm* — Novak Druce + Quigg LLP

(57) ABSTRACT

Multiple paths of an index tree may be traversed to discover a set of content descriptors that are match candidates for a set of query descriptors. A size of the set of candidate content descriptors may be optimized, for example, to reduce false positive matching errors, query latencies and/or index tree traversal times, at least in part by determining a number of child nodes to traverse based at least in part on current traverse level and/or traverse neighborhood thresholds. Index trees for large content descriptor sets may be built in resource constrained environments with approximation and/or refining build techniques.

26 Claims, 9 Drawing Sheets

SCALABLE TREE-BASED SEARCH OF CONTENT DESCRIPTORS

CROSS-REFERENCES TO RELATED APPLICATIONS

This application is related to co-pending U.S. patent application Ser. No. 12/779,741, filed herewith, and entitled "Scalable Tree Builds for Content Descriptor Search," the contents of which are hereby incorporated in its entirety by reference.

BACKGROUND

It has become commonplace to use computer systems to facilitate searches of large collections of content. As content collections have become larger, and the types of content in the collections have become richer and more varied, search facility designers are facing a growing array of problems. For example, larger collections of content tend to take longer to search, and attempts to reduce search time can reduce search accuracy. Similarly, it can take longer to search through collections of more complex content types and attempts to reduce search time in this respect can als lower search accuracy. Conventional search facility implementations have shortcomings with respect to such problems.

For some content types, such as images, one approach has been to characterize pieces of content with sets of content descriptors. The content descriptor sets may be designed to enable fast search and relatively low loss of accuracy with respect to content features in which users of the search facility are interested. For example, a piece of content may be characterized with a set of feature vectors in a vector space, and distance in the vector space used as a basis to cluster and index the vectors and ultimately the content. Vector spaces with a relatively high number of dimensions (e.g., 64 and 128 dimensional vector spaces are not uncommon) may enable fine discernment with respect to features of interest. However, conventional fast search of higher dimensional spaces (e.g., aided by various indexing structures) can incur a relatively high rate of error, such as "false positive" matches, which can be harmful to search accuracy.

One conventional indexing structure is an index tree built using hierarchical k-means clustering. The feature vectors characterizing the collection of content may be clustered into sufficiently many clusters so that individual clusters may be searched rapidly. These "lowest level" clusters may themselves be characterized by vectors in the vector space, for example, by determining a mean or center vector for the cluster, then these vectors clustered in turn to form a next layer of the indexing hierarchy, and so on until there is a single cluster that may serve as a root node of the index tree. However, conventional building procedures for the index tree can be relatively taxing on computational resources. Shortages of high quality computational resources, such as high speed random access memory, can result in inconvenient and even prohibitive index tree build times. The size of content collections and/or associated content descriptor sets can become large enough that a shortage of high quality computation resources is of practical concern.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
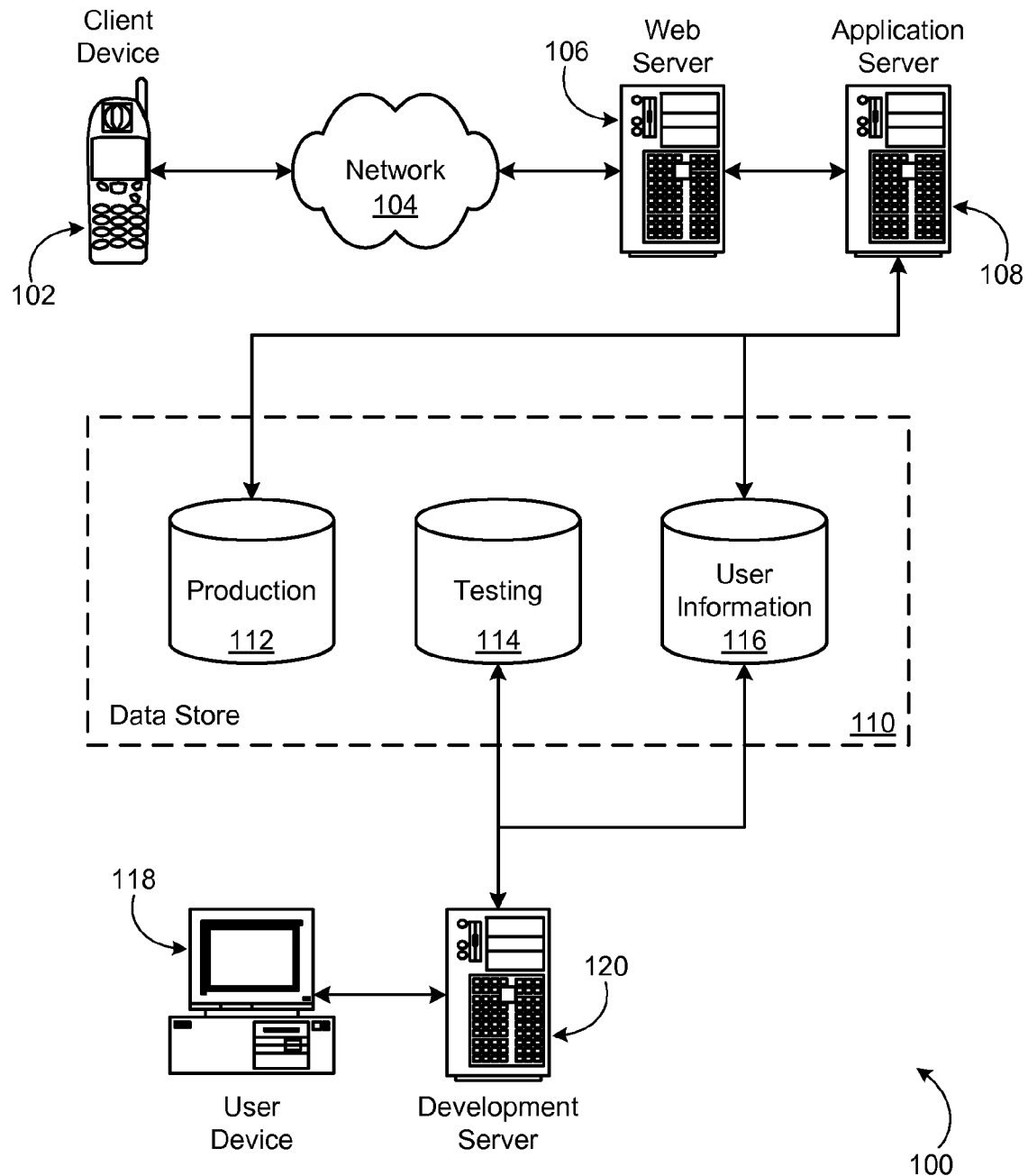
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A collection of content may be characterized with a set of content descriptors. For example, each image in a collection may be characterized with a set of feature vectors in a high dimensional vector space. A search of the collection of content may be facilitated by indexing the set of content descriptors with an indexing structure such as an index tree. A function, relation or metric ("metric") may be specified that determines distances between content descriptors, and the set of content descriptors may be clustered with respect to the metric. For example, the index tree may be built using a conventional hierarchical k-means (HKM) clustering technique.

Query content may be similarly characterized with a set of content descriptors ("query descriptors"). Content descriptors matching the query descriptors may be found at least in part by traversing the index tree. Consideration of too few content descriptors indexed by the index tree may result in false positive matching errors. However, consideration of too many matching content descriptor candidates may be inefficient, for example, may result in longer query response latencies. Discovery of matching content descriptor candidates may be enhanced at least in part by selecting a suitable set of paths for traversal. In at least one embodiment, part of selecting the set of paths for traversal includes selecting a suitable set of child nodes for traversal at each decision point. Index trees may be considered to include multiple levels of nodes, and a size of the set of child nodes selected for traversal may depend at least in part on a level of a parent node. The size of the set of child nodes selected for traversal may further depend at least in part on relative distances of candidate child nodes from query descriptor(s).

As the set of content descriptors to be indexed grows large, a shortage of high quality computation resources may result in inconvenient and even prohibitive index tree build times. Index tree build techniques are described below that work efficiently within constraints imposed by an available set of high quality computational resources. For example, an initial clustering may be performed with respect to a subset of the set of content descriptors to be indexed, and the set of content descriptors assigned to multiple processing bins. A sub-tree may be built that indexes the content descriptors in each processing bin, and the sub-trees merged to create the desired index tree. Alternatively, or in addition, an initial tree may be built for a subset of the set of content descriptors to be indexed, and the initial tree may be iteratively refined to index the remaining content descriptors in the set to be indexed.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers (PCs), cell phones, mobile phones, smart phones, third generation (3G) phones, touch-screen phones, handheld messaging devices, netbooks, computers incorporating touch-screens, tablet PCs, laptop computers, set-top boxes, personal data assistants (PDAs), electronic book readers, and the like. The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
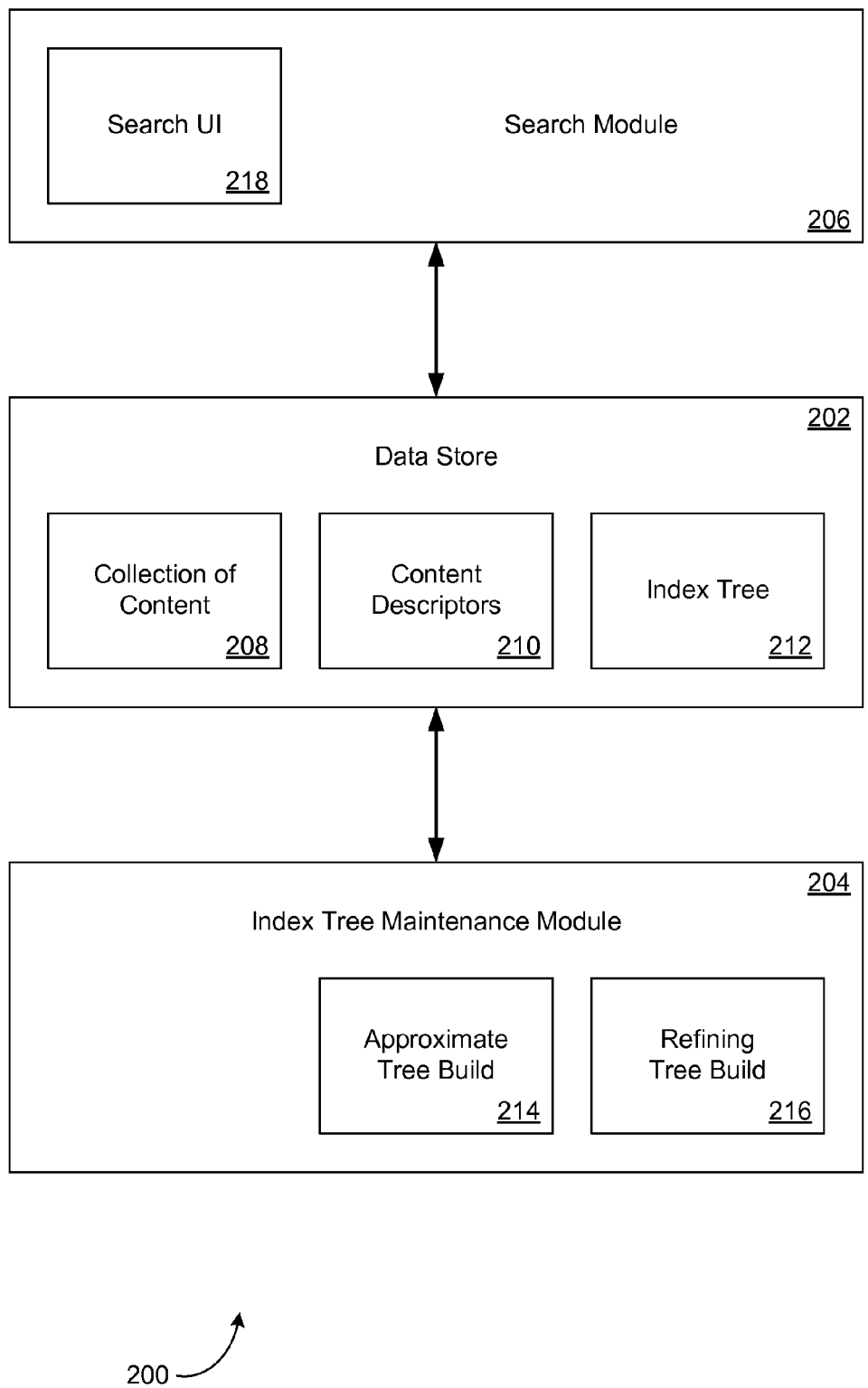
FIG. 2 is a schematic diagram depicting aspects of an example computerized system in accordance with at least one embodiment.

It will be helpful to have reference to an example system configured to facilitate search in accordance with at least one embodiment. FIG. 2 depicts aspects of an example computerized system 200 in accordance with at least one embodiment. The system 200 may include a data store 202, an index tree maintenance module 204, and a search module 206. The data store 202 may include a collection of content 208, a set of content descriptors 210 characterizing the collection of content 208, and an index tree 212 indexing the set of content descriptors 210. The index tree maintenance module 204 may include an approximate tree build module 214, and a refining tree build module 216, and may utilize the approximate tree build module 214 and/or the refining tree build module 216 to maintain the index tree 212. The search module 206 may include a search user interface (UI) module 218 capable of facilitating user interaction with the system 200. The search module 206 may traverse the index tree 212 to identify at least one of the set of content descriptors 210 and, ultimately, content in the collection 208, matching query content.

The arrows between the modules 202, 204, 206 in FIG. 2 indicate that the modules 202, 204, 206 are communicatively coupled, for example, by a communication network in a computer and/or between a plurality of computers such as the servers 106, 108, 120 of FIG. 1. For example, the search module 206 may be hosted and/or implemented at least in part by the application server 108, the data store 202 may incorporate and/or be incorporated at least in part by the data store 110, and the index tree maintenance module 204 may be hosted and/or implemented at least in part by the development server 120.

The collection of content 208 may include any suitable content. Examples of suitable content include electronic records, data structures, data objects, representations including representations of goods such as physical goods and commercial goods and representations of services such as commercial services, documents, document collections, images (including digital images in any suitable image format), audio, video, and suitable combinations thereof. Examples of suitable image formats include digital image formats such as raster formats including bitmaps (e.g., BMP), compressed images in accordance with a Joint Photographic Experts Group (JPEG) standard, graphics interchange formats (e.g., GIF), and portable network graphics formats (e.g., PNG), as well as vector formats such as computer graphics metafile formats (e.g., CGM) and scalable vector graphics formats (e.g., SVG).

Each piece of content in the collection of content 208 may be characterized by one or more of the set of content descriptors 210. Any suitable type of content descriptor may be utilized to describe content in the collection 208. Examples of suitable types of content descriptors include metrizable content descriptors such as feature vectors having co-ordinates that correspond to one or more content features. Examples of suitable feature vectors include scale-invariant feature vectors such as the "SIFT keys" described in David G. Lowe, "Object Recognition from Local Scale-Invariant Features," Proceedings of the International Conference on Computer Vision, September, 1999. Feature vectors may be selected from a vector space with any suitable number of dimensions (e.g., 64 dimensions, 128 dimensions). The index tree 212 may index the set of content descriptors 210 for fast matching with query descriptors. Example index structures in accordance with at least one embodiment are described below in more detail with reference to FIG. 3.

The index tree maintenance module 204 may maintain (e.g., build, create, modify, and/or update) the index tree 212. The index tree maintenance module 204 may build the index tree 212 based at least in part on the set of content descriptors 210. For example, where the content descriptors 210 are feature vectors, the index tree maintenance module 204 may build the index tree 212 utilizing a conventional hierarchical k-means clustering technique such as that described in Nistér et al., "Scalable Recognition with a Vocabulary Tree," Proceedings of the Institute of Electrical and Electronics Engineers (IEEE) Conference on Computer Vision and Pattern Recognition (CVPR), 2006. However, the set of content descriptors 210 may be large enough (e.g., on the order of terabytes) so that conventional index tree 212 build techniques result in build times that are at least inconvenient.

In at least one embodiment, one or more computers collectively facilitating the index tree maintenance module 204 may include computational resources of various qualities including multiple types and qualities of memory and/or storage. For example, the development server 120 (FIG. 1) may include relatively high quality storage, such as relatively fast random access memory (RAM), as well as relatively low quality storage, such as slower bulk storage (e.g., flash memory, one or more hard drives). Furthermore, the size of the relatively high quality storage may be less than the size of the relatively low quality storage. Such a configuration is not uncommon since, as a practical matter, high quality storage tends to cost more than low quality storage. For conventional index tree 212 build techniques, build times may increase significantly once the set of content descriptors 210 becomes too large to be contained (e.g., significantly contained, essentially contained and/or entirely contained) in a relatively high quality storage resource available to the index tree maintenance module 204. In such a case, the index tree maintenance module 204 may utilize the approximate tree build module 214 and/or the refining tree build module 216 to build the index tree 212 within a more convenient time period. Example procedures that may be performed by the approximate tree build module 214 and/or the refining tree build module 216 in accordance with an embodiment are described below in more detail with reference to at least FIG. 7 and FIG. 8.

The search UI module 218 may provide information from the search module 206 for presentation. For example, the search UI module 218 may generate a search user interface (UI) presentation specification and provide the specification to the client device 102 (FIG. 1) through the network 104. The search UI module 218 may specify the search UI presentation with any suitable presentation specification language including suitable hypertext markup languages (e.g., HTML) and suitable programming and/or scripting languages (e.g., JavaScript). The search UI module 218 may receive information responsive to the search UI presentation. For example, the search UI module 218 may receive search requests including query content from the client device 102. The search UI module 218 may process received requests and activate associated search module 206 functionality in response.

The search module 206 may receive query content, for example, from the search UI module 218. The query content may be of any type included in the collection of content and/or for which valid query descriptors corresponding to those included in the set of content descriptors 210 may be generated. The search module 206 may generate a set of query descriptors characterizing the query content, for example, in a same and/or similar manner that the content descriptors 210 are generated for the collection of content 208. The search module 206 may determine a subset of the set of content descriptors 210 that are nearest the set of query descriptors with respect to a specified metric. For example, the search module 206 may determine the subset of the set of content descriptors 210 nearest the set of query descriptors at least in part by traversing the index tree 212. Example steps for traversing the index tree 212 in accordance with at least one embodiment are described below with reference to FIG. 5.

Figure 3:
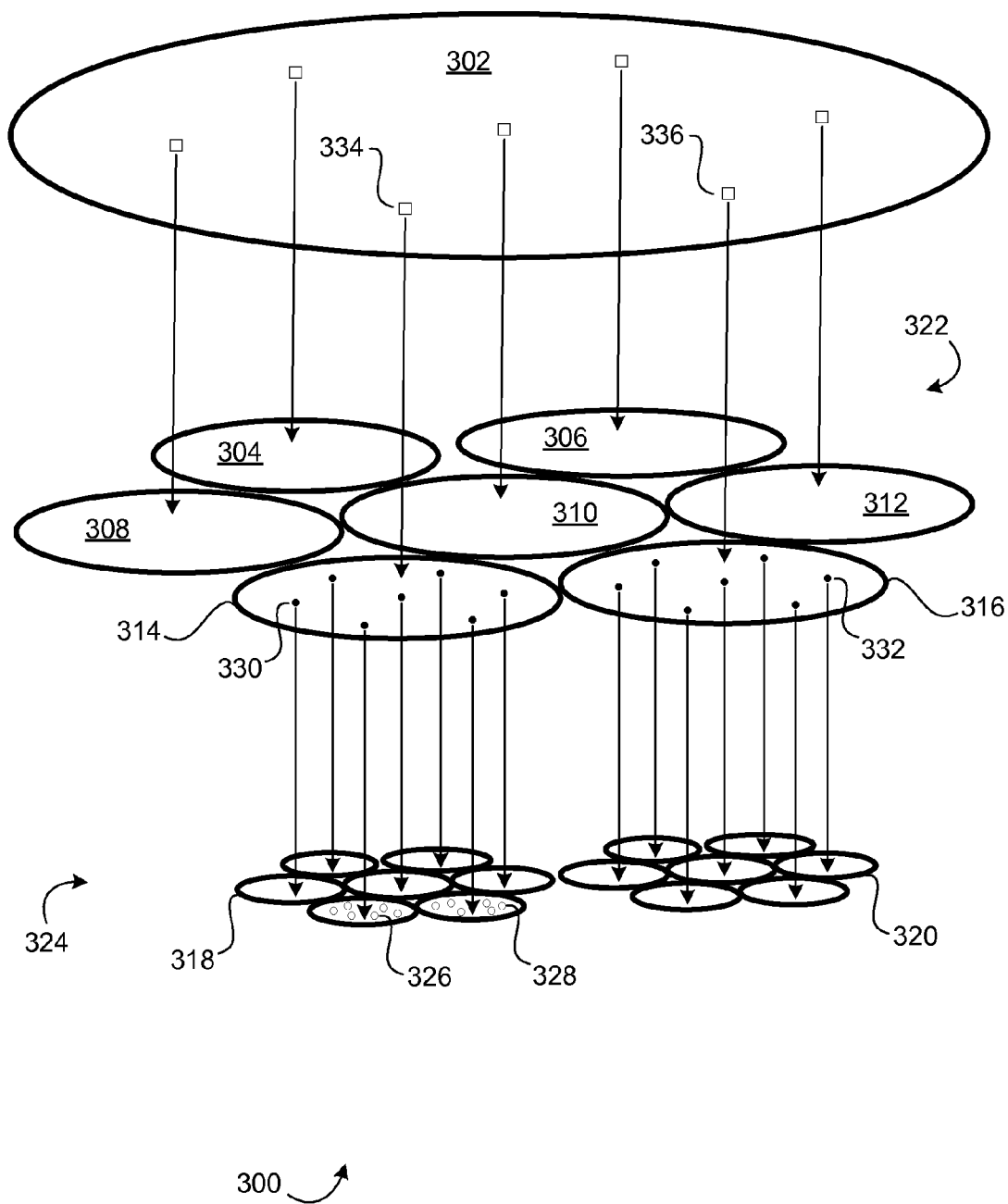
FIG. 3 is a schematic diagram depicting aspects of an example index tree in accordance with at least one embodiment.

Before turning to example steps that may be performed in accordance with at least one embodiment, it will be helpful to have reference to a more detailed example of the index tree 212. FIG. 3 depicts an example index tree 300 in accordance with at least one embodiment. The example index tree 300 includes a plurality of nodes 302, 304, 306, 308, 310, 312, 314, 316, 318, 320 arranged in a plurality of levels 302, 322, 324. The node 302 is a root node of the index tree 300. It may be considered to reside at level 0 (or the zeroth level) of the index tree 300. As depicted in FIG. 3, level 1 (or the first level) of the index 300 includes nodes 304, 306, 308, 310, 312, 314 and 316, while level 2 (or the second level) of the index tree 300 includes nodes 318, 320 and other unlabeled nodes of similar size. A level of a particular node in the index tree 300 may correspond to a path length between the node and the root node 302 through the index tree 300. Alternatively, or in addition, the root node may be considered to be a first level of the index tree 300, and the subsequent levels 322, 324 to have a level number accordingly incremented by one. Nodes having higher level numbers may be considered lower in the index tree 300 and/or beneath/below nodes having lower level numbers. Although, for clarity, this example index tree 300 is depicted as having two levels 322, 324, index trees in accordance with at least one embodiment may include any suitable number of levels (e.g., 6-10).

The lowest level nodes 324 such as nodes 318 and 320 reference and/or incorporate content descriptors 326, 328 and similar symbols (unlabeled for clarity). The content descriptors 326, 328 are examples of the content descriptors 210 of FIG. 2. Although not shown for clarity, each of the lowest level nodes 324 may reference and/or incorporate content descriptors such as the content descriptors 326, 328. As described above, the content descriptors 326, 328 may be viewed as points in a descriptor space and/or vectors in a vector space. For illustrative clarity, the content descriptors 326, 328 are depicted as points in a two dimensional descriptor space (exploded by level) having a Euclidean metric, however, a descriptor space in accordance with at least one embodiment may include any suitable number of dimensions and be constructed with respect to any suitable metric. Examples of suitable metrics include an angle between feature vectors of descriptors with respect to Euclidean and non-Euclidean geometries, suitable transforms of the angle such as trigonometric transforms of the angle and hypergeometric transforms of the angle, as well as inner products of feature vectors such as a "dot product" or scalar product of feature vectors.

Each of the nodes 302, 304, 306, 308, 310, 312, 314, 316, 318, 320 of the index tree 300 may by characterized and/or summarized by a node descriptor or index descriptor. For example, the nodes 318 and 320 may be characterized by index descriptors 330 and 322, respectively, and the nodes 314 and 316 may be characterized by index descriptors 334 and 336, respectively. Although it will be helpful to distinguish between index descriptors 330, 332, 334, 336 and content descriptors 326, 328, index descriptors 330, 332, 334, 336 may also be viewed as points in the descriptor space and/or vectors in the vector space, and may even be stored utilizing a same and/or similar data structure as content descriptors 326, 328. Furthermore, index descriptors 330, 332 may be based at least in part on content descriptors at least referenced by the nodes 318, 320 they characterize. For example, the index descriptor 330 may correspond to a point in the descriptor space that is a mean and/or a center (e.g., a geometric center) of the content descriptors at least referenced by the node 318. Similarly, index descriptors 334, 336 of higher level nodes 314, 316 may be based at least in part on index descriptors of lower level nodes (e.g., index descriptors 330, 332) at least referenced by the higher level nodes 314, 316. For example, the index descriptor 334 may correspond to a point in the descriptor space that is a mean and/or a center (e.g., a geometric center) of the index descriptors at least referenced by the node 314.

The size of the nodes 302, 304, 306, 308, 310, 312, 314, 316, 318, 320 of the index tree 300 depicted in FIG. 3 is intended to have a geometric meaning. The nodes 302, 304, 306, 308, 310, 312, 314, 316, 318, 320 may correspond to a correspondingly sized region of the descriptor space. Nodes depicted as adjacent in FIG. 3, such as nodes 304 and 308, may correspond to adjacent regions of the descriptor space. Lowest level nodes 324 may correspond to regions of the descriptor space containing the content descriptors at least referenced by the nodes 324. Higher level nodes 322 may correspond to regions of the descriptor space containing corresponding regions of lower level nodes, such as the nodes 318 and 320, at least referenced by the higher level nodes 322. Although not shown for clarity in FIG. 3, each of the higher level nodes 322 may reference multiple lower level nodes such as the nodes 318 and 320. The descriptor space region containment may be hierarchical. For example, the root node 302 may correspond to a region of the descriptor space containing content descriptors at least referenced by any of the lowest level nodes 324.

The index tree 300 may index the set of content descriptors 210 (FIG. 2). That is, each of the set of content descriptors 210 may be at least referenced by at least one of the lowest level nodes 324. In at least one embodiment, each of the set of content descriptors 210 is allocated to a unique one of the lowest level nodes 324 corresponding to a cluster determined with a suitable clustering technique such as k-means clustering. It is not required to determine distances in the descriptor space between a given query descriptor and each of the set of content descriptors to find a content descriptor nearest the query descriptor. In at least one embodiment, a search procedure may traverse the index tree 300 to determine a subset of lowest level nodes 324 nearest the query descriptor, and then compare the query descriptor to the subset of the set of content descriptors 210 referenced by the determined (nearest) subset of lowest level nodes. For example, the distance between the query descriptor and a particular node 314 of the index tree 300 may be based at least in part on (e.g., be equal to) the distance between the query descriptor and the index descriptor 334 of the node 314 with respect to the metric of the descriptor space. Example steps for traversing the index tree 300 in accordance with at least one embodiment are described in more detail below with reference to FIG. 5.

Figure 4:
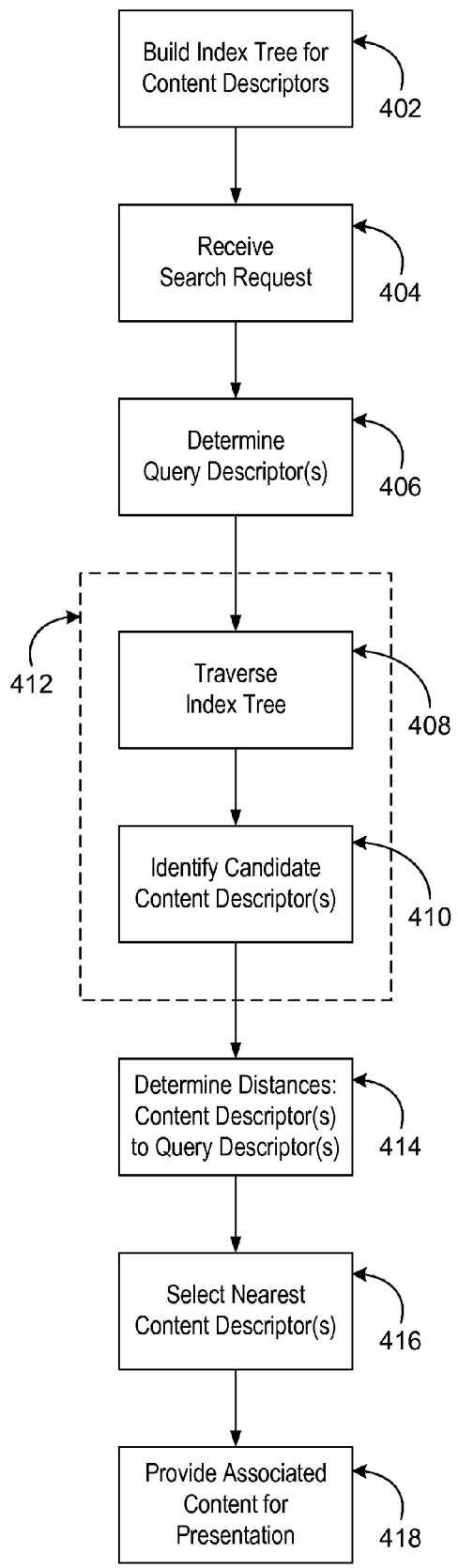
FIG. 4 is a flowchart depicting example steps for searching a collection of content in accordance with at least one embodiment.

Before describing example steps that may be incorporated in index tree traversal procedures in accordance with at least one embodiment, it will be helpful to provide an example procedural context. FIG. 4 depicts example steps for searching the collection of content 208 (FIG. 2) in accordance with at least one embodiment. At step 402, the index tree 212 may be built for the set of content descriptors 210. Building the index tree 212 may involve significant use of computation resources and/or time. Accordingly, step 402 may be a preparatory step to servicing search requests and/or performed relatively infrequently with respect to search request servicing and/or according to a schedule.

At step 404, a search request may be received. For example, the search module 206 (FIG. 2) may receive the search request from the client device 102 (FIG. 1). The search request may include at least a reference to query content. For example, the search request may include a query image or a reference, such as a uniform resource locator (URL), to the query image. At step 406, a set of query descriptors may be determined for the query content. For example, the search module 206 may generate the set of query descriptors for the query content in a same and/or similar manner that the content descriptors 210 were generated for the collection of content 208.

At step 408, the index tree 212 (FIG. 2) may be traversed. For example, the search module 206 may traverse the index tree 212 to identify a subset of lowest level nodes nearest the set of query descriptors. Example steps for traversing the index tree 212 in accordance with at least one embodiment are described below in more detail with reference to FIG. 5. At step 410, a set of candidate content descriptors may be identified. For example, the search module 206 may identify the set of content descriptors at least referenced by the subset of lowest level nodes identified at step 408 as the set of candidate content descriptors. Dashed line 412 in FIG. 4 indicates that steps 408 and 410 may be integral. For example, identification of the set of candidate content descriptors may be integral to traversal of the index tree 212.

At step 414, distances may be determined between each of the set of query descriptors and each of the set of candidate content descriptors. For example, the search module 206 (FIG. 2) may determine the distances with respect to the metric of the descriptor space in which the query descriptors and the content descriptors are located (e.g., as points or vectors). At step 416, a set of nearest content descriptors may be selected. For example, the search module 206 may select a subset of the set of candidate content descriptors nearest the set of query descriptors with respect to the distances determined at step 414. At step 418, content in the collection 208 associated with the set of nearest content descriptors selected at step 416 may be provided for presentation. For example, the search module 206 may determine content in the collection 208 that matches the set of nearest content descriptors selected at step 416 and provide at least reference to the matching content to the client device 102 (FIG. 1).

Figure 5:
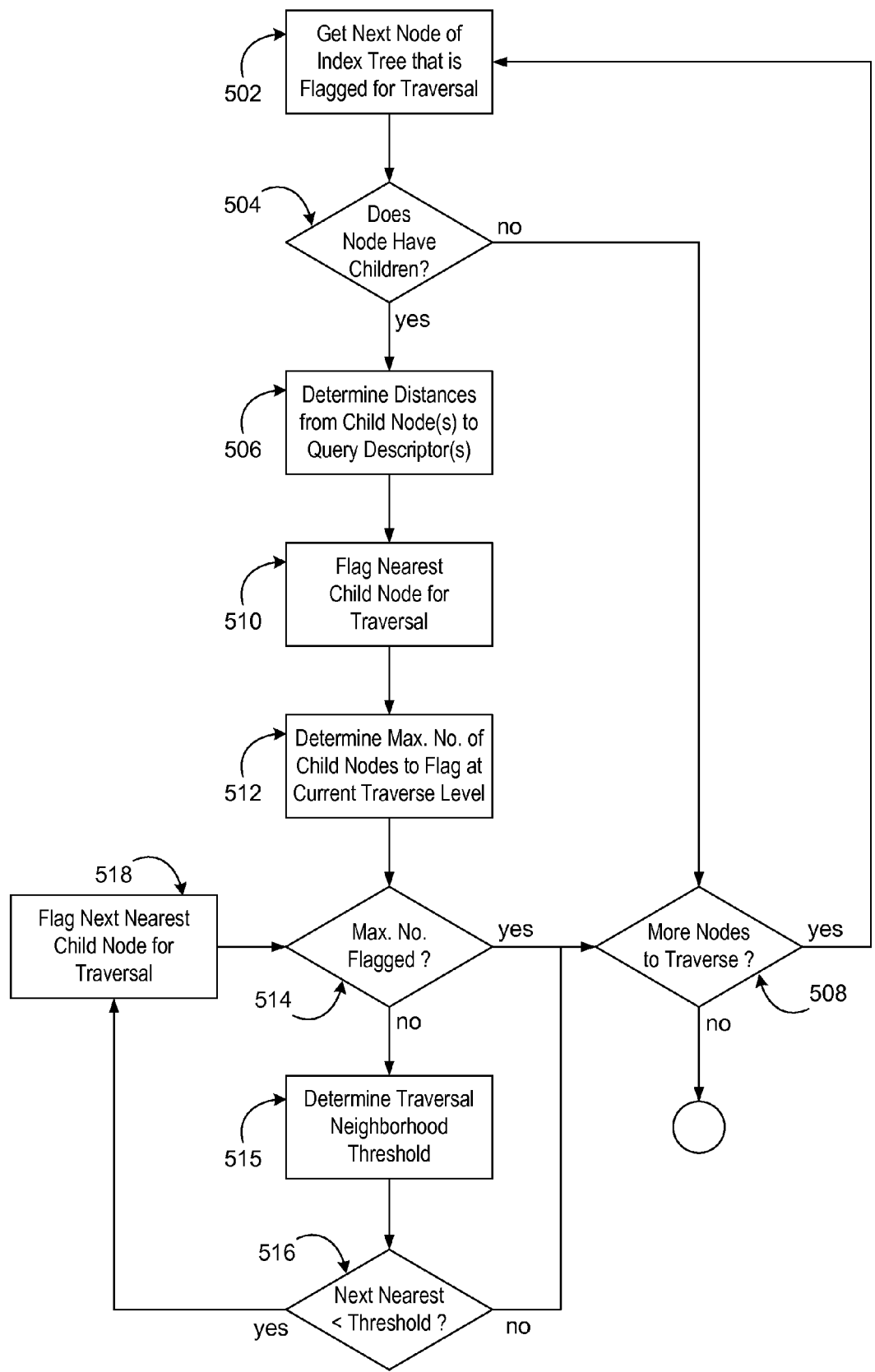
FIG. 5 is a flowchart depicting example steps for index tree traversal in accordance with at least one embodiment.

In at least one embodiment, a size of the set of candidate descriptors identified at step 410 is significant. Too small a size may result in matching errors including false positive matching errors. Too large a size may result in increased search request response latency, for example, due to slow index tree 212 (FIG. 2) traversal times. FIG. 5 depicts an example process for traversing an index tree 212 in accordance with at least one embodiment. The example process shown in FIG. 5 is best described with reference to an index tree 600 shown in FIG. 6. Aspects of the index tree 600 correspond to the index tree 300 of FIG. 3. The index tree 600 shown in FIG. 6 has a plurality of nodes 602, 604, 606, 608, 610, 612, 614, 616, 618, 620, 622, 624, 626, 628, 630, 632 arranged in a plurality of levels 634, 636, 638. The lowest level nodes 638 reference a set of content descriptors 640 including content descriptor 642 that is nearest of the set of content descriptors 640 to a given query descriptor 644. As with the index tree 300, node sizes in the index tree 600 may be understood as corresponding to descriptor space region sizes, and the descriptor space region corresponding to a parent node (e.g., node 604) may be understood as containing the descriptor space regions corresponding to its child nodes (e.g., nodes 610, 612, 614, 616).

At step 502, a next (e.g., a first) node of the index tree 600 that is flagged for traversal may be selected. For example, the search module 206 (FIG. 2) may initially select the root node 602 of the index tree 600. In at least one embodiment, the root node 602 of the index tree 600 is initially flagged for traversal. A procedure incorporating one or more steps depicted in FIG. 5 may utilize any suitable node flagging technique. Examples of suitable node flagging techniques include identifying and/or selecting nodes for traversal, as well as adding at least references to nodes to one or more node traversal lists and/or sets. In at least one embodiment, selecting a flagged node for traversal includes unflagging the node. At step 504, it may be determined whether the node selected at step 502 has one or more child nodes. If so, the procedure may progress to step 506. Otherwise, the procedure may progress to step 508. For example, the search module 206 may determine that the root node 602 has child nodes 604, 606 and 608.

At step 506, one or more distances between each of a set of query descriptors and each of the child nodes of the node selected at step 502 may be determined. For example, the set of query descriptors may have been determined at step 406 of FIG. 4, and the distance(s) may be determined with respect to the metric of the descriptor space by the search module 206 (FIG. 2). The search module 206 may determine distances between the query descriptor 644 and index descriptors of each of the nodes 604, 606 and 608. At step 510, a nearest one of the one or more child nodes may be flagged for traversal. For example, the search module 206 may flag node 606 for traversal.

At step 512, a maximum number of child nodes to flag for traversal (a "fan-out" threshold) may be determined. In at least one embodiment, the fan-out threshold is based at least in part on the level of the index tree 600 containing the node selected at step 502 and/or its child nodes. For example, the fan-out threshold may be a linear function of the level. Alternatively, the fan-out threshold may be a non-linear function of the level. Each of the levels of the index tree 600 may be classified into one of a plurality of level classes. Each of the level classes may be associated with a fan-out threshold (e.g., of 2-10). For example, levels of the index tree 600 may be classified into one or more upper level classes, one or more middle level classes and/or one or more lower level classes, and the upper level class(es) may each have an upper fan-out threshold (e.g., 2), the middle level class(es) may each have a middle fan-out threshold (e.g., 3), and the lower level class(es) may each have a lower fan-out threshold (e.g., 2). In at least one embodiment, a greatest matching error reduction may be achieved by setting the middle fan-out threshold to be greater than the upper fan-out threshold and/or the lower fan-out threshold.

The search module 206 (FIG. 2) may identify that the root node 602 resides at the zeroth level of the index tree 600 and, at step 512, determine that the fan-out threshold is 2. At step 514, it may be determined whether the maximum number of child nodes has been flagged for traversal. If so, the procedure may progress to step 508. Otherwise, the procedure may progress to step 515.

At step 515, a traversal neighborhood threshold may be determined. For example, the search module 206 (FIG. 2) may determine the traversal neighborhood threshold based on the level of the index tree 600 containing the node selected at step 502, a size of a region of the descriptor space to which the node selected at step 502 corresponds, a number of child nodes of the node selected at step 502, and/or a number of content descriptors referenced by the node selected at step 502 (directly or indirectly). In at least one embodiment, the traversal neighborhood threshold is based at least in part on a distance between the query descriptor and a nearest child node (the "reference distance"). Relative distances and/or thresholds may be determined (e.g., normalized) with respect to the reference distance. The traversal neighborhood threshold may be a linear function of the reference distance. Alternatively, the traversal neighborhood threshold may be a nonlinear function of the reference distance.

At step 516, it may be determined whether a next nearest child node is at a distance and/or a relative distance from the set of query descriptors that is less than the traversal neighborhood threshold. If so, the procedure may progress to step 518. Otherwise, the procedure may progress to step 508. For example, search module 206 may determine that the next nearest child node 604 is at a distance and/or a relative distance from the query descriptor 644 that is less than the traversal neighborhood threshold (e.g., less than 120%-180% of the reference distance).

At step 518, the next nearest child node identified at step 516 may be flagged for traversal. For example, the search module 206 (FIG. 2) may flag node 604 (FIG. 6) of the index tree 600 for traversal. The procedure may then progress to step 514 to determine if the fan-out threshold has been reached. Because the fan-out threshold for the zeroth level 634 was determined to be 2 at step 512, and nodes 606 and 604 have been flagged for traversal, the procedure progresses to step 508.

At step 508, it may be determined whether there are more nodes flagged for traversal (e.g., previously flagged for traversal at steps 510 and 518). If so, the procedure may return to step 502 to select the next node for traversal. Otherwise, the procedure may progress to one or more steps not shown in FIG. 5 such as step 410 of FIG. 4. The search module 206 (FIG. 2) may determine that nodes 606 and 604 are flagged for traversal and, as yet, untraversed. Accordingly, the procedure may return to step 502 to select the next node 606 for traversal.

The search module 206 (FIG. 2) may determine (e.g., at step 504) that node 606 has child nodes 618, 620, 622, 624, that node 618 is nearest the query descriptor 644 (e.g., at step 510), and that the fan-out threshold for the first level 636 is 3. The search module 206 may further determine (e.g., at steps 516) that nodes 622 and 624 are less than the traversal neighborhood threshold and flag them for traversal at step 518. Similarly, the search module 206 may determine that node 604 has child nodes 610, 612, 614, 616, that node 616 is nearest the query descriptor 644, that nodes 614 and 612 are within the traversal neighborhood threshold, and, accordingly, flag nodes 616, 614 and 612 for traversal.

Figure 6:
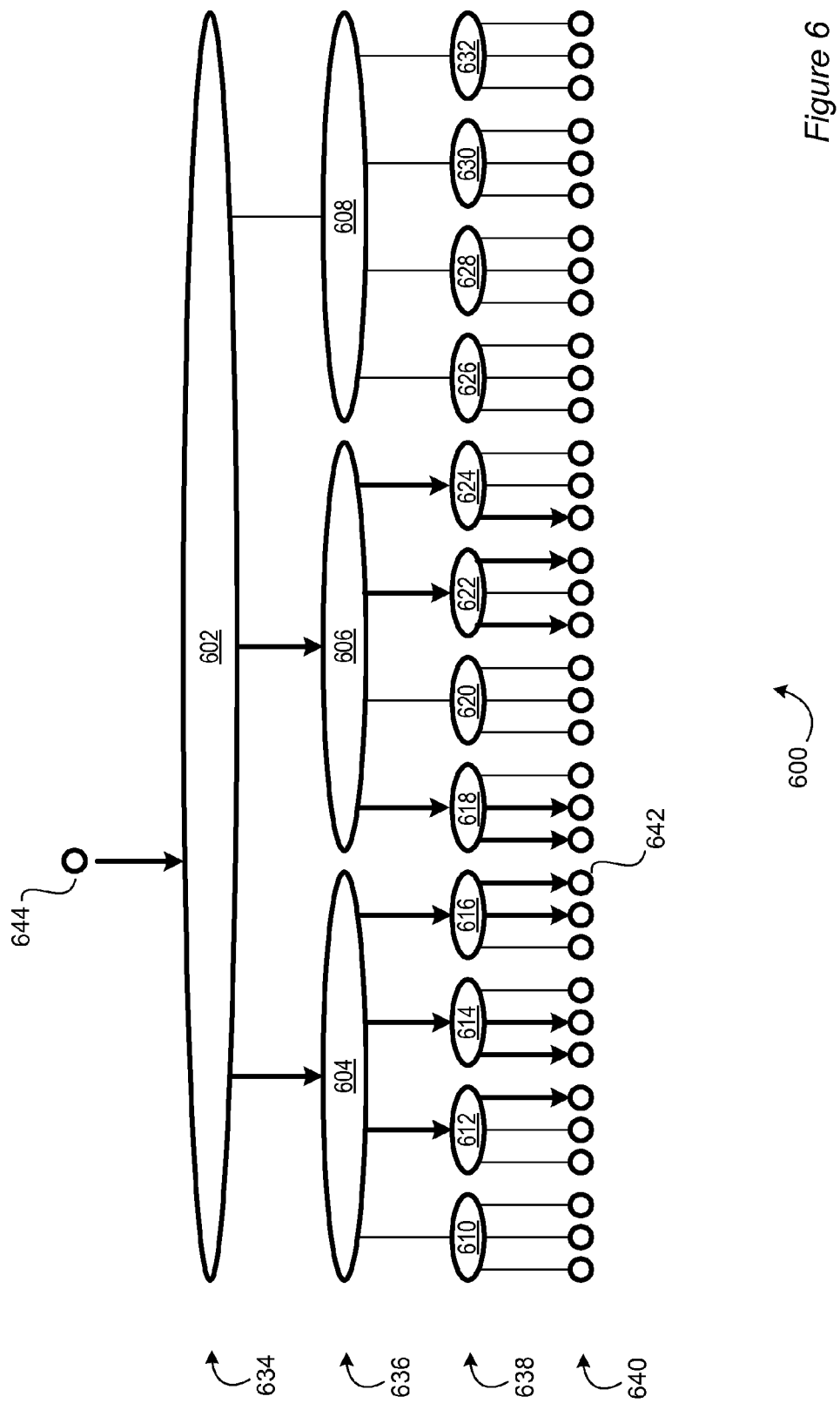
FIG. 6 is schematic diagram depicting aspects of an example index tree traversal in accordance with at least one embodiment.

Using the example index tree 600 shown in FIG. 6, the process may identify a subset of the content descriptors 640 once a subset of the lowest level nodes 638 is determined. It may be that the content descriptors are not considered traversable nodes of the index tree 600. For example, a result of the procedure may be to identify the nodes 612, 614, 616, 618, 622 and 624 as the set of lowest level nodes nearest the query descriptor 644, and the procedure may progress to step 410 of FIG. 4 to identify candidate content descriptors (e.g., those content descriptors referenced by the nodes 612, 614, 616, 618, 622 and 624). Alternatively, as in the example referencing FIG. 6, content descriptors may be considered traversable nodes of the index tree 600. Accordingly, identification of the candidate content descriptors may be integral to traversal.

As shown in FIG. 6, node 618 references three content descriptors (each unlabeled). As described above with reference to FIG. 5 and FIG. 6, the fan-out threshold for the second level 638 may be 2. In this case, the search module 206 (FIG. 2) may determine that two of the child nodes of node 618 are within the traversal neighborhood threshold. FIG. 6 illustrates that the two child nodes of node 618 are within the traversal neighborhood threshold with bold traversal arrows. FIG. 6 further illustrates that two child nodes of each node 614, 616 and 622 are within the traversal neighborhood threshold for the node. With respect to nodes 612 and 624, FIG. 6 illustrates that, although the fan-out threshold for the second level 628 is 2, only one child node of each of nodes 612 and 624 is determined to be within the traversal neighborhood threshold.

FIG. 6 illustrates that content descriptor 642 is the "nearest neighbor" to query descriptor 644. Content descriptor 642 is not referenced by node 606 although node 606 was initially identified as the node nearest to the query descriptor 644. In particular, the content descriptor 642 is not referenced by one of the child nodes 618, 620, 622, 624 of node 606.

Figure 7:
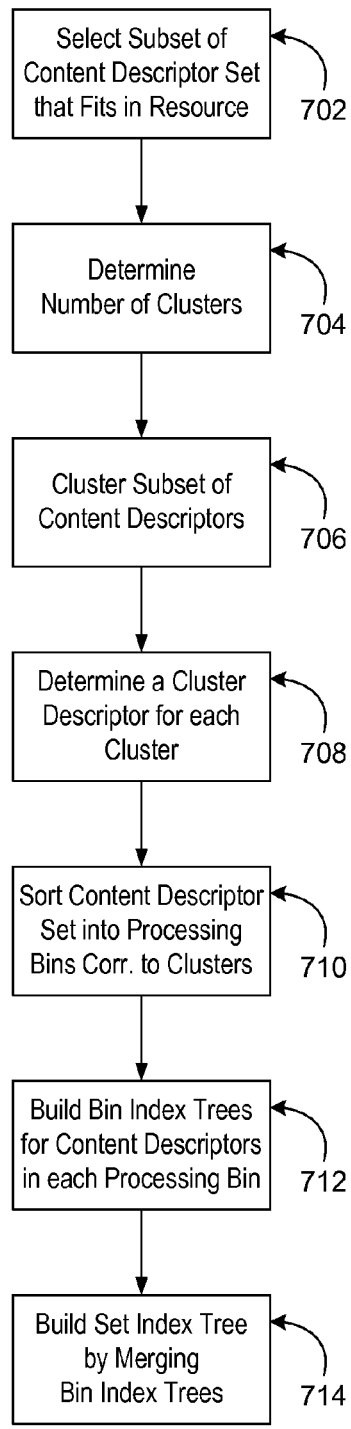
FIG. 7 is a flowchart depicting example steps for an approximate index tree build in accordance with at least one embodiment.

As described above, when the set of content descriptors 210 (FIG. 2) is large, performance of step 402 of FIG. 4, for example, by the index tree maintenance module 204, may involve significant use of computational resources and/or time. Furthermore, when the set of content descriptors 210 is too large to fit in an available amount of relatively high quality storage, index tree 212 build times may become inconvenient and even prohibitive. The description turns now to index tree 212 build procedures in accordance with at least one embodiment when the set of content descriptors 210 is too large to fit in the available amount of relatively high quality storage. FIG. 7 depicts example steps for building the index tree 212 in accordance with at least one embodiment. For example, the steps of FIG. 7 may be performed by the approximate tree build module 214 of FIG. 2.

At step 702, a subset of the set of content descriptors 210 (FIG. 2) may be selected that fits in the available amount of relatively high quality storage. For example, the approximate tree build module 214 may selected the subset at least in part by sampling the set of content descriptors 210. Any suitable sampling technique may be utilized by the approximate tree build module 214 as part of selecting the subset. Examples of suitable sampling techniques include deterministic techniques such as uniform sampling, as well as random and pseudorandom sampling.

Suppose the index tree 300 (FIG. 3) is the tree that would be conventionally built if the set of content descriptors 210 (FIG. 2) fit in the available amount of relatively high quality storage. The subset of the set of content descriptors 210 selected at step 702 may be utilized to approximate regions of the descriptor space corresponding to nodes 304, 306, 308, 310, 312, 314, 316 of the first level 322 of the index tree 300. At step 704, a number of clusters into which to cluster the subset of the set of content descriptors 210 may be determined. For example, the approximate tree build module 214 may determine the number of clusters based at least in part on a size of the set of content descriptors 210 and/or the available amount of relatively high quality storage. The approximate tree build module 214 may set the number of clusters to be greater than, or equal to, the size of the set of content descriptors 210 divided by the available amount of relatively high quality storage.

At step 706, the subset of the set of content descriptors 210 (FIG. 2) may be clustered into the number of clusters determined at step 704. For example, the approximate tree build module 214 may cluster the subset utilizing any suitable clustering technique such as k-means clustering. At step 708, a cluster descriptor may be determined for each of the clusters created at step 706. For example, the approximate tree build module 214 may determine the cluster descriptors as described above for index descriptors of lowest level nodes 318, 320 (FIG. 3).

At step 710, the set of content descriptors 210 (FIG. 2) may be sorted into processing bins that correspond to the clusters created at step 706. For example, a processing bin may be created (e.g., in the data store 202) for each cluster created at step 706. The approximate tree build module 214 may place each of the set of content descriptors 210 into the processing bin corresponding to the cluster having the cluster descriptor that is nearest the content descriptor with respect to the metric of the descriptor space. The approximate tree build module 214 may furthermore limit each processing bin to a number of content descriptors that may fit in the available amount of relatively high quality storage. Step 710 may be considered to be part of a first build pass of the set of content descriptors 210.

At step 712, a bin index tree may be built for the content descriptors in each processing bin. For example, the approximate tree build module 214 (FIG. 2) may build an index tree corresponding to the index tree 300 (FIG. 3) for each of the processing bins created at step 710 utilizing a conventional hierarchical k-means clustering technique. Step 712 may be considered to be part of a second build pass of the set of content descriptors 210. At step 714, the index tree 212 for the set of content descriptors 210 may be built based at least in part on the bin index trees built at step 712. The approximate tree build module 214 may merge the bin index trees built at step 712 to build the index tree 212. For example, the approximate tree build module 214 may create the index tree 212 at least in part by adding the root nodes of the bin index trees built at step 712 as child nodes to the root node of the index tree 212.

Figure 8:
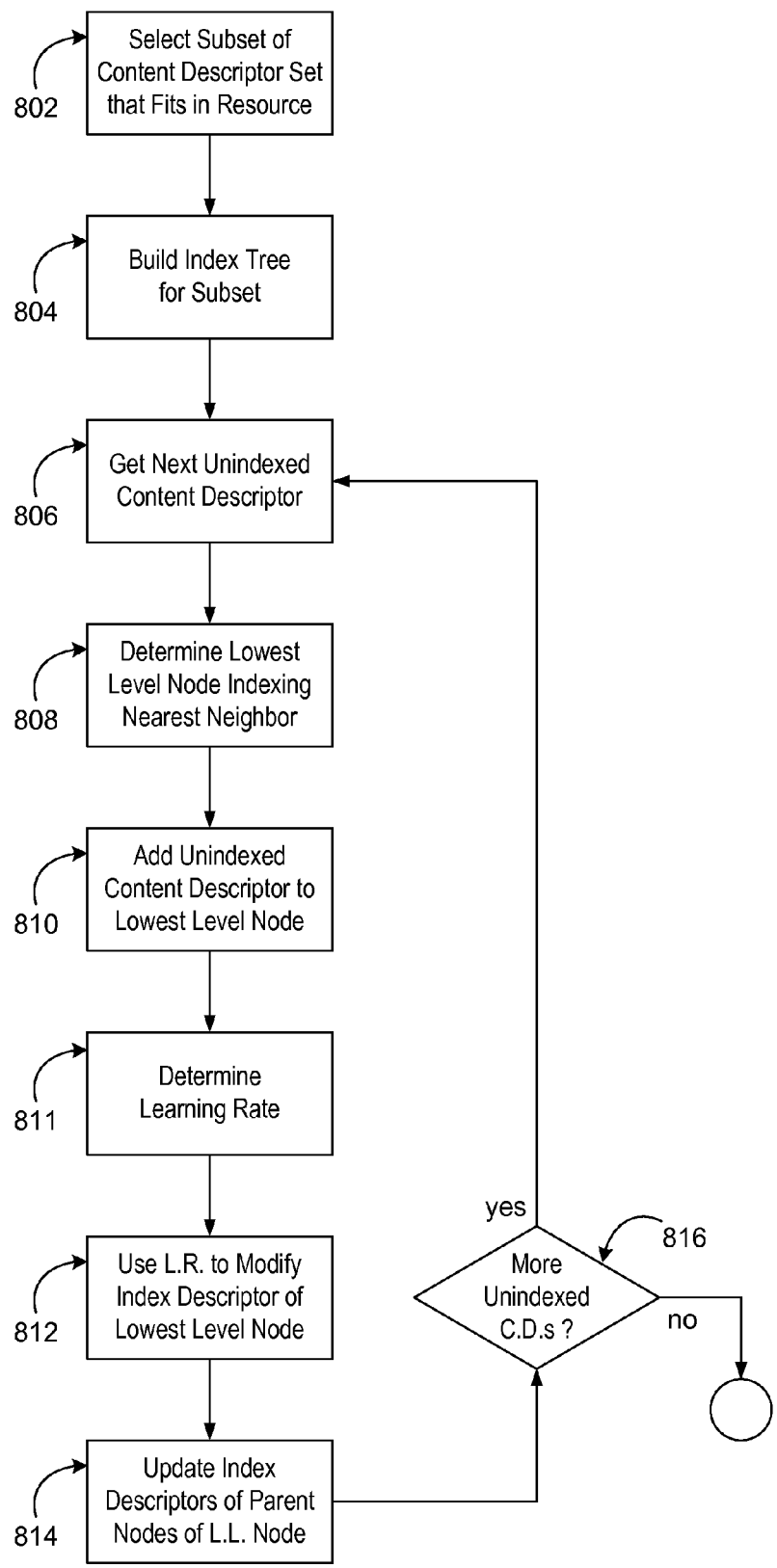
FIG. 8 is a flowchart depicting example steps for a refining index tree build in accordance with at least one embodiment.

Once the index tree 212 (FIG. 2) has been established, it may be desirable to have a capability to update the index tree 212 responsive to changes to the set of content descriptors 210 without performing a full index tree build such as the one described above with reference to FIG. 7. FIG. 8 depicts example steps for a refining index tree 212 build in accordance with at least one embodiment. For example, the steps of FIG. 8 may be performed by the refining tree build module 216.

Steps 802 and 804 of FIG. 8 may be included in an index tree 212 (FIG. 2) building procedure in the case that the index tree 212 has not yet been established. At step 802, a subset of the set of content descriptors 210 may be selected that fits in the available amount of relatively high quality storage. For example, the subset may be selected as described above for step 702 of FIG. 7. At step 804, the index tree 212 may be established for the subset of the set of content descriptors 210, for example, utilizing a conventional hierarchical k-means clustering technique.

At step 806, a next (e.g., a first) unindexed content descriptor in the set of content descriptors 210 (FIG. 2) may be selected. For example, the refining tree build module 216 may select the next of the set of content descriptors 210 not yet indexed by the index tree 212. At step 808, a lowest level node indexing a content descriptor that is nearest the unindexed content descriptor (the "new parent node") may be determined. For example, the refining tree build 216 may traverse the tree as described above with reference to FIG. 4 and FIG. 5 to determine the indexed content descriptor nearest the unindexed content descriptor (where the unindexed content descriptor plays the role of a query descriptor) and/or its indexing lowest level node. At step 810, the unindexed content descriptor may be added as a child of the new parent node.

At step 811, a learning rate may be determined. The learning rate may correspond to an amount by which the index descriptor for the new parent node is adjusted with respect to the content descriptor newly added to the new parent node at step 810. For example, considering the index descriptor and the unindexed content descriptor as points in the descriptor space, co-ordinates of the index descriptor may be adjusted so as to reduce the distance between the index descriptor and the unindexed content descriptor by the learning rate (e.g., by 20%-50% of the current distance). Examples of learning rates in accordance with at lest one embodiment are described in more detail below with reference to FIG. 9. At step 812, the index descriptor for the new parent node may be updated. For example, the refining tree build module 216 (FIG. 2) may adjust the index descriptor of the new parent node in accordance with the learning rate determined at step 811.

At step 814, the index descriptors of each of the parent nodes of the new parent node may be updated, for example, as described for the new parent node with reference to step 812. With reference to FIG. 3, suppose it is determined at step 808 that the unindexed content descriptor should be added to node 318. The index descriptor 330 of the node 318 would be updated at step 812, and the index descriptor 334 of the node 314 would be updated at step 814. If node 312 were not the root node of the index tree 300, or if node 312 had an index descriptor, the index descriptor of node 312 would also be updated at step 814.

Alternatively, or in addition, a plurality of learning rates may be determined at step 811. The new parent node may be classified as a "winning" node. Another subset of lowest level nodes may be classified as "losing" nodes. For example, the losing subset of lowest level nodes may include lowest level nodes considered as candidates for the winning node. Further lowest level node classes may be identified. For example, lowest level nodes not considered as candidates to be the winning node may be classified as noncandidate nodes. Learning rates may be determined for each class of lowest level node. Alternatively, or in addition, learning rates may be determined for each lowest level node, for example, based on node classification. The learning rate of the winning node may correspond to movement of the node's index descriptor towards the newly added content descriptor. The learning rate of the losing nodes may correspond to movement of the node's index descriptor away from the newly added content descriptor. Each node for which a learning rate was determined may have its index descriptor modified at step 812. The parents of each node with a modified index descriptor may be updated at step 814.

At step 816, it may be determined whether there are any more unindexed content descriptors in the set of content descriptors 210 (FIG. 2). If so, the procedure may return to step 806. Otherwise, the procedure may progress to steps not shown in FIG. 8 such as step 404 of FIG. 4. The test at step 816 and the return to step 806 to process the next unindexed content descriptor may be repeated until the index tree 212 indexes each of the content descriptors 210. The steps depicted in FIG. 8 may be considered to be part of a single build pass of the set of content descriptors 210.

Figure 9:
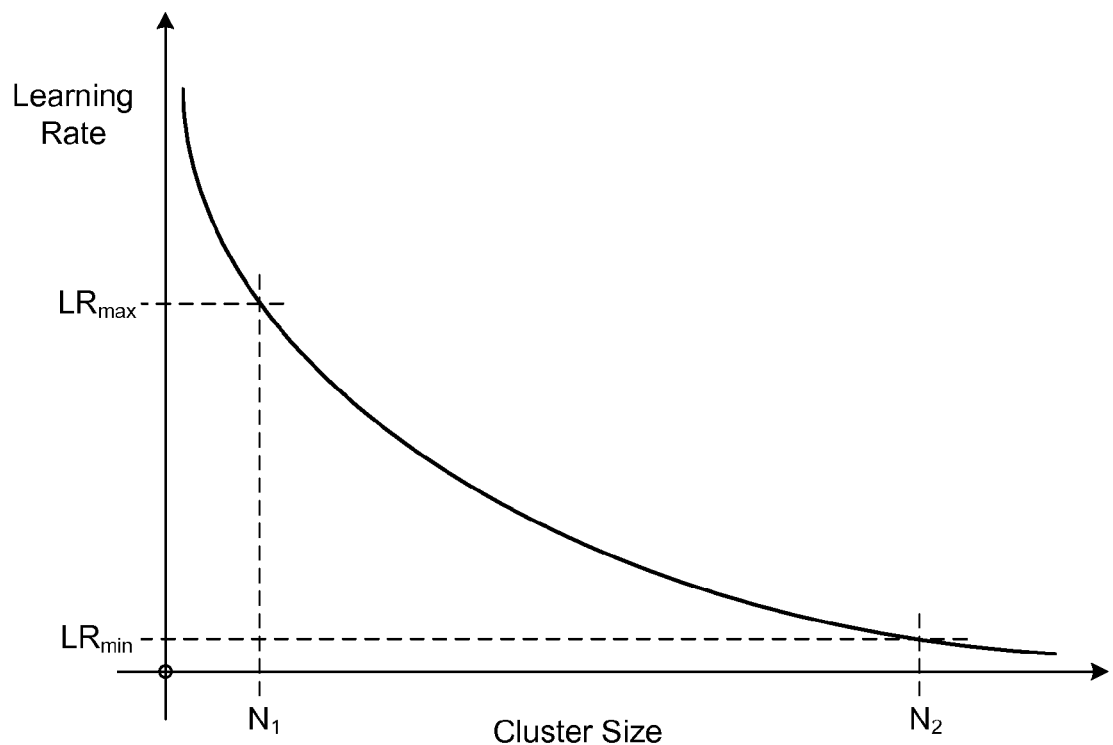
FIG. 9 is a graph of learning rate in accordance with at least one embodiment.

The learning rate utilized at step 812 may be a constant (e.g., a 40% reduction). Alternatively, the learning rate may vary based at least in part on one or more suitable learning rate parameters. Examples of suitable learning rate parameters include a size of a node and/or cluster for which the index descriptor is being updated, proximity and/or relatively proximity between the index descriptor and the newly added content descriptors, the number of content descriptors indexed by the index tree 212, a number of content descriptors remaining unindexed, and suitable combinations thereof including ratios and linear combinations. The size of the node and/or cluster in this context may be the number of child nodes referenced by the node and/or the number of descriptors in the cluster. The learning rate may be a linear function of the learning rate parameters. Alternatively, the learning rate may be a non-linear function of the learning rate parameters. FIG. 9 shows an example graph 900 of learning rate in accordance with at least one embodiment.

The graph 900 shows learning rate decreasing non-linearly from a maximum learning rate ($LR_{max}$) to a minimum learning rate ($LR_{min}$) as the size of the node and/or cluster increases. The maximum learning rate may be utilized for node and/or cluster sizes less than, or equal to, a first cluster size threshold ($N_1$). The minimum learning rate may be utilized for node and/or cluster sizes less than, or equal to, a second cluster size threshold ($N_2$). As node and/or cluster size increases from the first cluster size threshold to the second cluster size threshold, the learning rate may decrease polynomially or exponentially from the maximum learning rate to the minimum learning rate.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for searching a collection of content, comprising:
   under control of one or more computer systems configured with executable instructions,
   receiving a search request corresponding to query content, the query content characterized by at least one query descriptor;
   traversing an index tree including a plurality of levels that indexes a set of content descriptors characterizing the collection of content, the traversing including, at one or more of the plurality of levels of the index tree:
       determining distances between child nodes of a distinguished node of the index tree and said at least one query descriptor based at least in part on index descriptors of the child nodes, each index descriptor representing a summarized characteristic for each child node;
       determining a maximum number of child nodes to select for traversal based at least in part on the level of the distinguished node, the level of the distinguished node having a threshold relative to one or more other levels; and
       selecting for traversal, in order of distance from said at least one query descriptor, at most the maximum number of child nodes, the maximum number being determined based at least in part on the level of the distinguished node;
   selecting a subset of the content descriptors based at least in part on the traversing of the index tree; and
   providing for presentation at least a reference to content in the collection characterized by at least one of the subset of content descriptors.

2. A computer-implemented method according to claim 1, wherein each of the descriptors includes a vector of a vector space.

3. A computer-implemented method according to claim 2, wherein determining the distance between each child node and each query descriptor includes determining an angle between the vector of the index descriptor of the child node and the vector of the query descriptor.

4. A computer-implemented method according to claim 1, wherein determining the distance between each child node and each query descriptor includes determining the distance between the index descriptor of the child node and the query descriptor with respect to a metric of a descriptor space.

5. A computer-implemented method according to claim 1, wherein selecting the subset of the content descriptors includes selecting content descriptors indexed by traversed nodes.

6. A computer-implemented method for searching a collection of content, comprising:
   under control of one or more computer systems configured with executable instructions,
   determining at least one query descriptor based at least in part on query content; and
   determining a subset of a set of content descriptors characterizing the collection of content, the set of content descriptors being indexed by an index tree including a plurality of nodes at a plurality of node levels by, at least:
       determining, for a parent node in at least one of the plurality of node levels, a number of child nodes to traverse, the number of child nodes to traverse based at least in part on the node level of the parent node, the node level of the parent node having a threshold relative to one or more other node levels; and
       traversing at most the number of child nodes nearest in distance to said at least one query descriptor as part of identifying a set of lowest level nodes indexing the subset of the set of content descriptors, the number of child nodes nearest in distance being determined based at least in part on index descriptors of the child nodes, each index descriptor representing a summarized characteristic for each child node.

7. A computer-implemented method according to claim 6, further comprising providing for presentation at least a reference to content in the collection associated with at least one of the determined subset of the set of content descriptors.

8. A computer-implemented method according to claim 6, wherein:
the plurality of node levels of the index tree is classified into a plurality of level classes associated with a plurality of fan-out thresholds; and
determining the number of child nodes to select for traversal includes setting the number of child nodes to select for traversal based at least in part on at least one fan-out threshold associated with the level class of the node level.

9. A computer-implemented method according to claim 8, wherein the plurality of level classes comprises:
an upper level class classifying at least one node level of the index tree;
a middle level class classifying at least one node level of the index tree lower than said at least one node level in the upper level class; and
a lower level class classifying at least one node level of the index tree lower than said at least one level in the middle level class.

10. A computer-implemented method according to claim 9, wherein each fan-out threshold associated with the middle level class has a magnitude greater than or equal to a magnitude of each fan-out threshold associated with the lower level class.

11. A computer-implemented method according to claim 10, wherein the magnitude of each fan-out threshold associated with the middle level class is greater than or equal to a magnitude of each fan-out threshold associated with the upper level class.

12. A computer-implemented method according to claim 6, wherein selecting for traversal at most the number of child nodes includes:
selecting a first nearest child node to said at least one query descriptor for traversal;
determining a relative distance of at least a second nearest child node from said at least one query descriptor with respect to the first nearest child node; and
selecting said at least the second nearest child node for traversal if the relative distance is less than a traversal neighborhood threshold.

13. A computer-implemented method for searching a collection of content, comprising:
under control of one or more computer systems configured with executable instructions,
determining at least one query descriptor based at least in part on query content;
determining a subset of a set of content descriptors indexed by an index tree at least in part by traversing the index tree to identify a set of lowest level nodes indexing the subset, the traversing including:
selecting a first nearest child node to said at least one query descriptor for traversal;
determining a relative distance of at least a second nearest child node from said at least one query descriptor with respect to the first nearest child node, the distance being determined based at least in part on index descriptors of the first and second nearest child nodes, each index descriptor representing a summarized characteristic for each child node; and
selecting said at least the second nearest child node for traversal if the relative distance is less than a traversal neighborhood threshold; and providing for presentation at least a reference to content in the collection associated with at least one of the set of content descriptors.

14. A computer-implemented method according to claim 13, wherein determining the relative distance includes normalizing a distance between said at least one query descriptor and said at least the second nearest child node with respect to a distance between said at least one query descriptor and the first nearest child node.

15. A computer-implemented method according to claim 13, wherein the traversing further includes bounding the number of selected child nodes based at least in part on traversal level in the index tree.

16. A computer-implemented method according to claim 13, wherein:
the traversing further includes determining a maximum number of child nodes to select for traversal based at least in part on traversal level; and
said at least the second nearest child node is selected for traversal if the relative distance is less than the traversal neighborhood threshold and if doing so does not exceed the determined maximum.

17. A computerized system for searching a collection of content, comprising:
a data store storing at least:
a set of content descriptors characterizing the collection of content; and
an index tree indexing the set of content descriptors; and
a processor; and
a memory device including instructions that, when executed by the processor, cause the processor to:
determine at least one query descriptor based at least in part on query content;
determine a subset of the set of content descriptors at least in part by traversing the index tree, the traversing including:
determining a number of child nodes to select for traversal based at least in part on traversal level; and
selecting for traversal at most the number of child nodes nearest in distance to said at least one query descriptor, the number of child nodes nearest in distance being determined based at least in part on index descriptors of the first and second nearest child nodes, each index descriptor representing a summarized characteristic for each child node; and
provide for presentation at least a reference to content in the collection characterized by at least one of the subset of the set of content descriptors.

18. A computerized system according to claim 17, wherein the number of child nodes to select for traversal is determined for each of a plurality of levels of the index tree.

19. A computerized system according to claim 17, wherein the instructions further cause the processor to provide a search user interface least configured to perform the providing for presentation responsive to a search request at least referencing the query content.

20. A computerized system according to claim 19, wherein the providing for presentation includes specifying the presentation with a presentation specification language.

21. A computerized system according to claim 17, wherein the determined number of child nodes to select for traversal at middle levels of the index tree is greater than the determined number of child nodes to select for traversal at lower levels of the index tree.

22. One or more non-transitory computer-readable media having collectively thereon computer-executable instructions that configure one or more computers to collectively, at least:

determine at least one query descriptor based at least in part on query content;

determine a subset of content descriptors indexed by an index tree at least in part by traversing the index tree, the traversing including:
 (a) selecting for traversal a first child node nearest to said at least one query descriptor;
 (b) determining a first distance of a second child node from said at least one query descriptor; and
 (c) selecting the second child node for traversal if the first distance is less than a traversal neighborhood threshold, the distance being determined based at least in part on an index descriptor of the second child node, the index descriptor representing a summarized characteristic for the second child node; and provide for presentation at least a reference to content characterized by at least one of the subset of content descriptors.

23. One or more non-transitory computer-readable media according to claim 22, wherein the content descriptors characterize a collection of content and said at least one query descriptor similarly characterizes the query content.

24. One or more non-transitory computer-readable media according to claim 22, wherein:

the first distance includes a relative distance normalized with respect to a second distance between the first child node and said at least one query descriptor; and the traversal neighborhood threshold includes a relative distance threshold.

25. One or more non-transitory computer-readable media according to claim 22, wherein the traversing further includes:

determining a second distance of a third child node from said at least one query descriptor; and selecting the third child node for traversal if the second distance is less than the traversal neighborhood threshold.

26. One or more non-transitory computer-readable media according to claim 22, wherein the traversing further includes:

initially selecting a root node of the index tree for traversal; and performing steps (a), (b) and (c) for each node of the index tree selected for traversal.

* * * * *